(12) United States Patent
De Spiegeleer

(10) Patent No.: US 11,732,602 B2
(45) Date of Patent: Aug. 22, 2023

(54) COMPOSITE MATERIAL FAN BLADE INTEGRATING LARGE CLEARANCE

(71) Applicant: SAFRAN AIRCRAFT ENGINES, Paris (FR)

(72) Inventor: Guy De Spiegeleer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 108 days.

(21) Appl. No.: 16/432,218

(22) Filed: Jun. 5, 2019

(65) Prior Publication Data
US 2019/0368376 A1 Dec. 5, 2019

(30) Foreign Application Priority Data

Jun. 5, 2018 (FR) ...................................... 1870650

(51) Int. Cl.
*F01D 5/28* (2006.01)
*F01D 5/14* (2006.01)
*F01D 21/04* (2006.01)

(52) U.S. Cl.
CPC ........... *F01D 21/045* (2013.01); *F01D 5/147* (2013.01); *F01D 5/282* (2013.01); *F05D 2230/30* (2013.01); *F05D 2260/30* (2013.01); *F05D 2300/603* (2013.01)

(58) Field of Classification Search
CPC ......... F01D 5/282; F01D 5/284; F01D 21/045
See application file for complete search history.

(56) References Cited

U.S. PATENT DOCUMENTS

| 7,837,446 | B2 * | 11/2010 | McMillan | ............... | F01D 5/282 416/224 |
| 9,045,991 | B2 * | 6/2015 | Read | ....................... | F01D 5/282 |
| 9,527,777 | B2 * | 12/2016 | Chamberlain | ...... | C04B 41/5105 |
| 9,828,862 | B2 * | 11/2017 | Zatorski | .................. | F01D 5/282 |
| 10,612,560 | B2 * | 4/2020 | Kray | ...................... | F01D 21/045 |
| 10,746,045 | B2 * | 8/2020 | Kray | ...................... | F01D 5/147 |
| 2005/0106002 | A1 | 5/2005 | Gerez et al. | | |

(Continued)

FOREIGN PATENT DOCUMENTS

| EP | 1 312 762 A1 | 5/2003 |
| EP | 3 015 646 A1 | 5/2016 |

(Continued)

OTHER PUBLICATIONS

Search Report as issued in French Application No. 1870650, dated Feb. 15, 2019.

(Continued)

*Primary Examiner* — Justin D Seabe
(74) *Attorney, Agent, or Firm* — Pillsbury Winthrop Shaw Pittman LLP

(57) ABSTRACT

A composite material blade for a fan of a turbine engine, includes a first portion that extends to the root of the blade and that is made of a first material including first fiber reinforcement densified by a first matrix, the blade also including a second portion that extends to the tip of the blade and that is made of a second material that is different from the first material and that includes second fiber reinforcement densified by a second matrix, the second material possessing abrasion resistance that is less than that of the first material.

12 Claims, 7 Drawing Sheets

(56) References Cited

U.S. PATENT DOCUMENTS

| | | |
|---|---|---|
| 2006/0216154 A1 | 9/2006 | McMillan |
| 2013/0224035 A1* | 8/2013 | Alexander ......... B29D 99/0025 |
| | | 416/230 |
| 2014/0064964 A1 | 3/2014 | Care et al. |
| 2014/0112796 A1 | 4/2014 | Kray et al. |
| 2016/0230570 A1* | 8/2016 | Harris ............... C04B 35/62894 |
| 2019/0242399 A1* | 8/2019 | Kray ..................... F01D 21/045 |
| 2019/0389777 A1* | 12/2019 | Shi .................... C04B 35/62884 |

FOREIGN PATENT DOCUMENTS

| | | |
|---|---|---|
| EP | 3 279 431 A1 | 2/2018 |
| WO | WO 2012/001279 A1 | 1/2012 |

OTHER PUBLICATIONS

Notice of Opposition to a European Patent as filed in European Patent No. EP 3578760 B1, dated Aug. 18, 2021.
First Office Action as issued in Chinese Patent Application No. 201910486418.0, dated Jun. 6, 2022.

* cited by examiner

COMPOSITE MATERIAL FAN BLADE INTEGRATING LARGE CLEARANCE

CROSS-REFERENCE TO RELATED APPLICATIONS

This application claims priority to French Patent Application No. 1870650, filed Jun. 5, 2018, the entire content of which is incorporated herein by reference in its entirety.

FIELD

The present invention relates to the general field of aviation turbine engines, and more particularly to the fans of aviation turbine engines.

BACKGROUND

As shown in FIG. 1, an aircraft turbine engine 1' includes a fan 2', the fan 2' being a large diameter propeller situated at the inlet of the turbine engine and driven in rotation by the low pressure shaft of the turbine engine 1'.

In the event of losing a blade 21' of the fan 2', e.g. as a result of a foreign body striking the fan 2', a decoupler is generally provided on the fan shaft 3' in order to limit the mechanical load caused by the unbalance resulting from the fan 2' rotating while missing a blade 21'. A decoupler is a sacrificial bearing for securing the fan shaft 3' and it is designed to break when mechanical loads become excessive, so as to allow the fan shaft 3' to move off-center, thereby limiting the mechanical stresses imposed on the fan shaft 3' and transmitted to the load-carrying structures of the turbine engine.

Thus, in order to enable the fan 2' to continue to rotate, so that the turbine engine 1' continues to rotate when the fan shaft 3' is off-center, a zone of weakness 4', referred to as "large clearance", is provided in the internal outline of the fan casing 5'. This zone of weakness or large clearance 4' is configured to disappear on coming into contact with a blade 21', thereby enabling the blade 21' to continue rotating. The large clearance 4' also forms a zone where the turbine engine cannot contain equipment, since any equipment situated in the large clearance 4' is in danger of being struck by a blade 21'.

Document EP 1 312 762 in the name of the Applicant describes a fan blade including a zone of weakness at its tip suitable for breaking when the tip of the blade strikes the fan casing. That solution makes it possible to reduce the thickness of the fan casing and to increase the diameter of the fan.

Nevertheless, the solution described in Document EP 1 312 762 is complex to implement, has a negative impact on the surface state of the blade, and is not suitable for fan blades made of fiber-reinforced composite material.

SUMMARY

A main aspect of the present invention is thus to mitigate such drawbacks by proposing a fan.

In a first aspect, the invention provides a composite material blade for a fan of a turbine engine, the blade being characterized in that it comprises a first portion that extends to the root of the blade and that is made of a first material comprising first fiber reinforcement densified by a first matrix, the blade also comprising a second portion that extends to the tip of the blade and that is made of a second material that is different from the first material and that comprises second fiber reinforcement densified by a second matrix, the second material possessing abrasion resistance that is less than that of the first material.

Such a fan blade thus comprises a layer of sacrificial material at its tip that is formed by the second portion, and that is configured to be removed in the event of coming into contact with the fan casing, thereby forming the large clearance. Removal of the layer of sacrificial material at the blade tip takes place by very rapid wear or by decomposition of the layer of sacrificial material.

The fact that the matrix of the blade at the tip of the blade is made of a second material that is more fragile than the first material enables a fan blade to be made of fiber-reinforced composite material that possesses a sacrificial zone at its tip so as to form the large clearance.

In addition, the fact that the large clearance is formed by a matrix reinforced by fiber reinforcement ensures that the large clearance has good mechanical strength against the stresses to which the outer annular end of the airfoil is subjected.

The blade may also comprise the following characteristics:
the first fiber reinforcement and the second fiber reinforcement are made by a single fiber preform, the first matrix and the second matrix possessing different compositions, and the second matrix possessing abrasion resistance that is less than that of the first matrix;
the first fiber reinforcement is made by a fiber preform, and the second fiber reinforcement is made by short fibers;
the first matrix and the second matrix possess the same composition;
the first matrix and the second matrix possess different compositions, the second matrix possessing abrasion resistance that is less than that of the first matrix;
the tip of the blade is covered in a layer of a third material that possesses abrasion resistance that is less than that of the second material; and
the second portion has a height lying in the range 1% to 10% of the height of the blade, and in an embodiment in the range 2% to 5% of the height of the blade.

In a second aspect, the invention provides a turbine engine including a blade in accordance with any of the above characteristics.

The turbine engine may also comprise the following characteristics:
the turbine engine has a fan casing with an internal annular surface that possesses abrasion resistance that is greater than that of the second material; and
the fan is driven in rotation by a shaft, the shaft being secured to the turbine engine by a main bearing, and the shaft also being secured to the turbine engine by a decoupler bearing that has a breaking limit that is lower than that of the main bearing.

In a third aspect, the invention provides a method of fabricating a blade in accordance with any of the above characteristics, the method comprising the following steps:
fabricating the first portion of the blade that extends to the root of the blade and that is made of the first material that comprises the first fiber reinforcement densified by the first matrix; and
fabricating the second portion of the blade that extends to the tip of the blade and that is made of the second material that comprises the second fiber reinforcement densified by the second matrix, the second material possessing abrasion resistance that is less than that of the first material.

The method may also comprise the following characteristics, taken singly or in combination depending on technical feasibility:

the first portion is fabricated by densifying the first matrix in a first zone of a fiber preform forming the first fiber reinforcement, the first zone extending to a first end of the fiber preform that corresponds to the root of the blade, and the second portion is fabricated by using the second matrix to densify a second zone of the fiber preform forming the second fiber reinforcement, the second zone extending to a second end of the fiber preform that corresponds to the tip of the blade, the first matrix and the second matrix possessing different compositions, the second matrix possessing abrasion resistance that is less than that of the first matrix;

the fiber preform is densified by a first matrix over its entire length, and then the first matrix is eliminated over the second zone of the fiber preform, and then the second zone of the fiber preform is densified with the second matrix after eliminating the first matrix;

the first portion is fabricated by densifying a fiber preform over its entire length with the first matrix, the fiber preform forming the first fiber reinforcement, and the second portion is fabricated by molding the second matrix having short fibers dispersed therein to form the second fiber reinforcement onto one end of the fiber preform;

the first matrix and the second matrix possess the same composition;

the first matrix and the second matrix possess different compositions, the second matrix possessing abrasion resistance that is less than that of the first matrix; and a layer of a third material that possesses abrasion resistance less than that of the second material is deposited on the tip of the blade.

BRIEF DESCRIPTION OF THE DRAWINGS

Other characteristics and benefits of the present invention appear from the following description made with reference to the accompanying drawings, which show an embodiment having no limiting character. In the figures.

DETAILED DESCRIPTION

Figure 1:
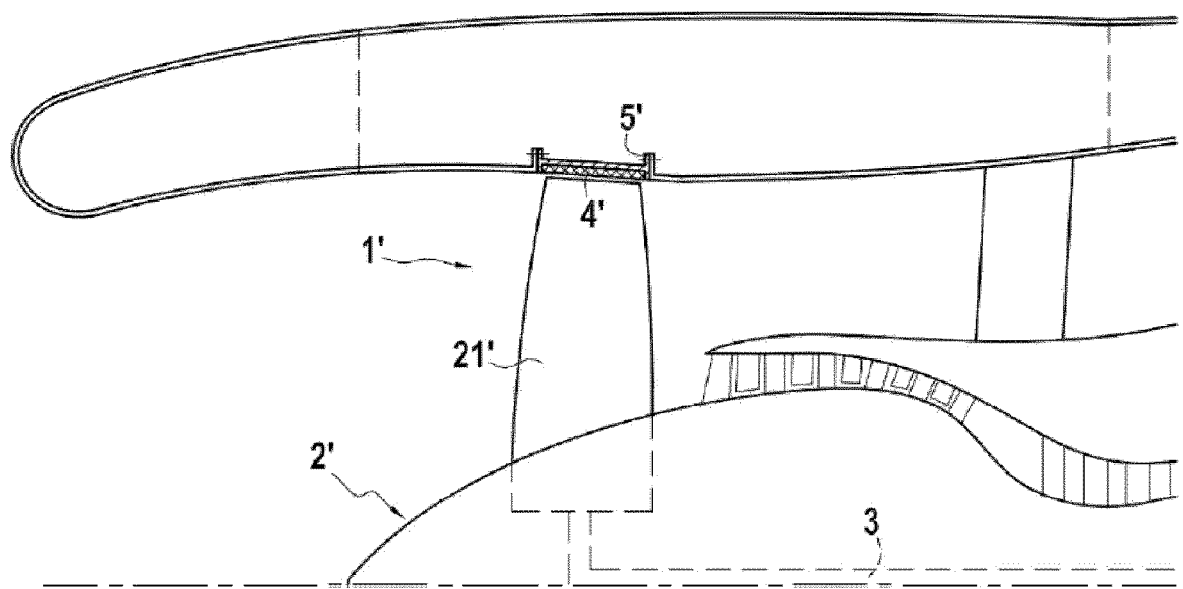
FIG. 1 is a diagrammatic section view of a prior art fan.
Figure 2:
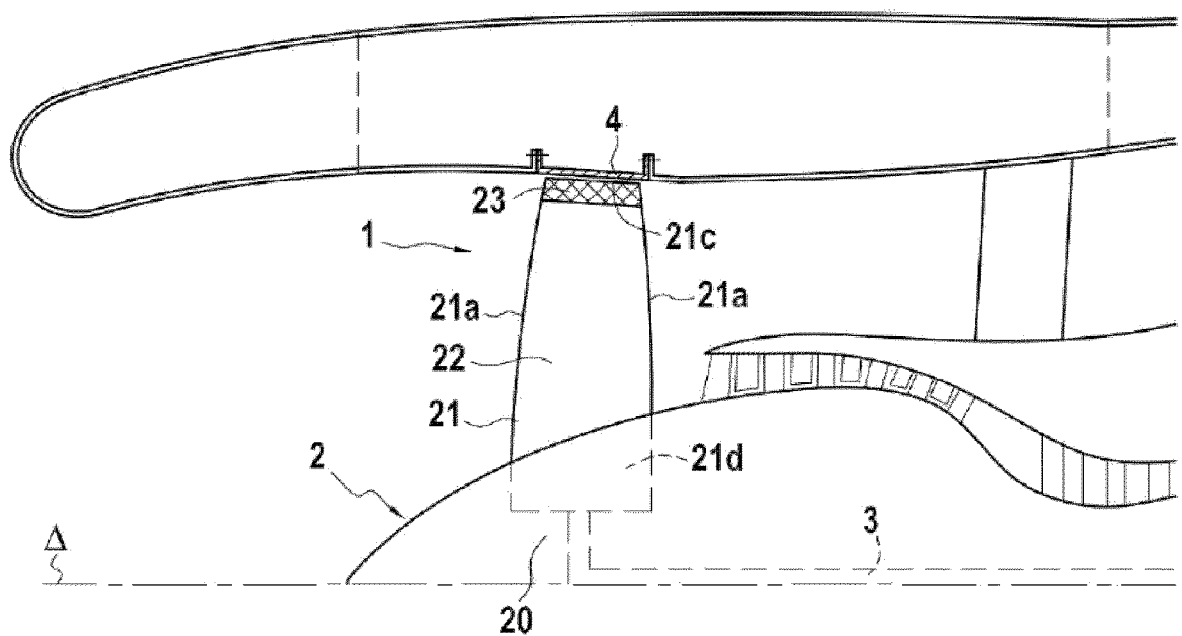
FIG. 2 is a diagrammatic section view of a fan in an embodiment of the invention.
Figure 3A:
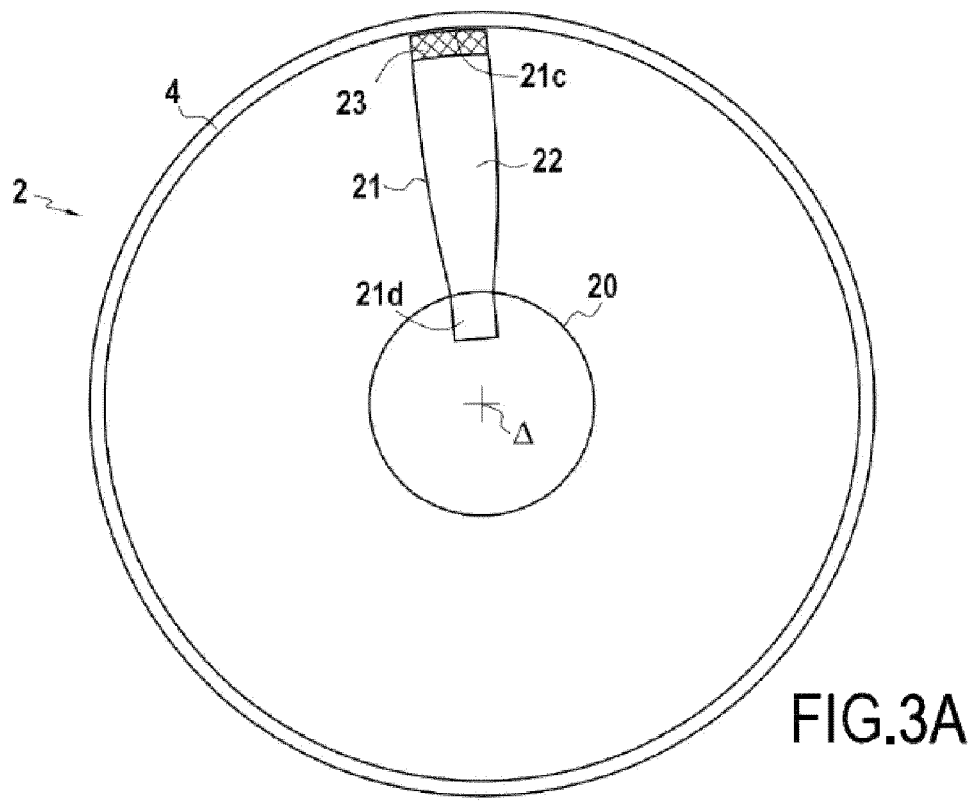
FIG. 3A is a diagrammatic front view of the FIG. 2 fan during normal operation of the turbine engine.
Figure 3B:
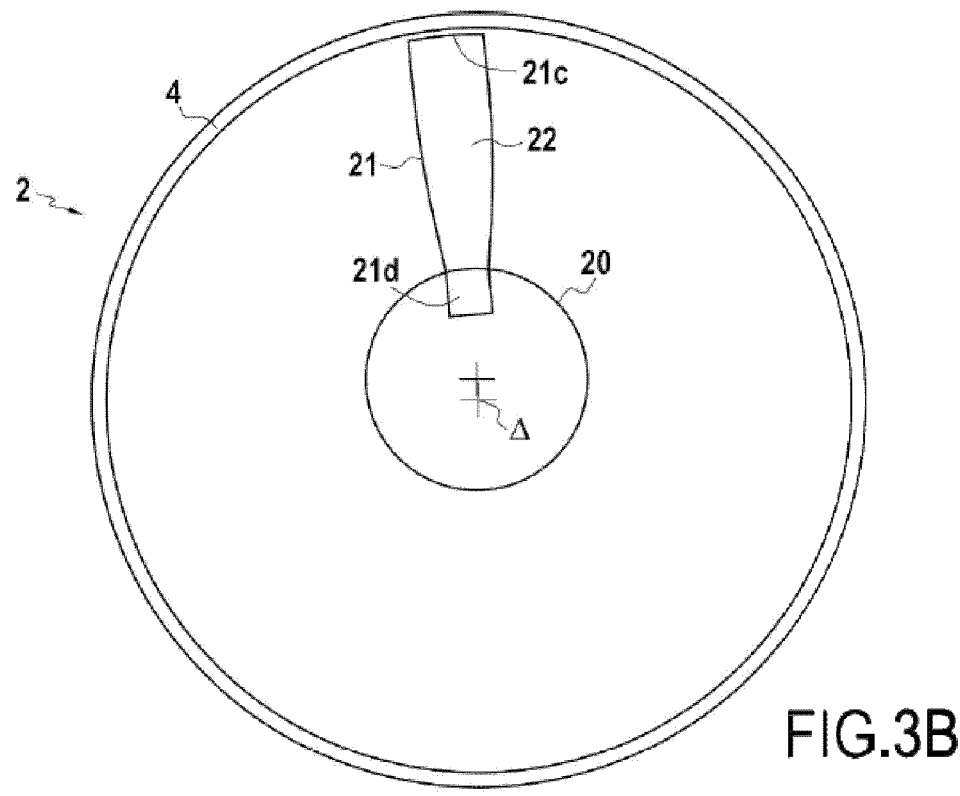
FIG. 3B is a diagrammatic front view of the FIG. 2 fan when the fan is off-center.

As shown in FIGS. 2, 3A, and 3B, a turbine engine 1 has a fan 2 comprising a plurality of blades 21. A single blade 21 is shown in the figures for the purposes of simplification. The fan 2 is driven in rotation about the axis Δ of the turbine engine 1 by a fan shaft 3. The fan shaft 3 may be constituted by the low pressure shaft of the turbine engine 1, or the fan shaft 3 may be driven in rotation by the low pressure shaft via reduction gearing.

The fan shaft 3 is secured to the remainder of the turbine engine 1 by bearings allowing the fan shaft to rotate. Among the bearings securing the fan shaft 3, the turbine engine includes at least one main bearing and at least one decoupler bearing, the at least one decoupler bearing having a breaking limit that is lower than the limit of the at least one main bearing. Thus, the or each decoupler bearing acts as a sacrificial bearing by breaking under the effect of an unbalance caused by losing a blade 21.

The fan 2 is surrounded over its entire outline by a fan casing 4. The casing 4 is an annular part centered on the axis Δ of the turbine engine. The diameter of the internal annular surface of the fan casing 4 is almost equal to the diameter of the fan 2 so as to reduce parasitic flows between the fan 2 and the fan casing 4. The fan casing 4 may be a part made of metal or of ceramic.

The blades 21 of the fan 2 are made of composite material including fibers, e.g. carbon fibers, that are densified by an organic matrix. The fibers are woven, which weaving may be three-dimensional weaving. The term "three-dimensional weaving" or "3D weaving" or indeed "multilayer weaving" is used herein to mean a weaving technique in which at least some of the weft yarns interlink warp yarns over a plurality of warp layers, or vice versa, with the weaving being performed using a weave that may in particular be selected from among the following weaves: interlock, multi-plain, multi-satin, and multi-twill.

Each blade 21 has a leading edge 21a, a trailing edge 21b, a tip 21c, and a root 21d. The tip 21c of a blade 21 is its end that is situated radially farther from the axis Δ and that faces the fan casing 4, while the root 21d of a blade 21 is its end that is situated radially closer to the axis Δ and that is fastened to a fan hub 20.

The blades 21 comprise a first portion 22 extending from the root 21d along the main long direction of the blade 21, and a second portion 23 extending from the tip 21c along the main long direction of the blade 21. The first portion 22 and the second portion 21 are in contact with each other.

The first portion 22 of each blade 21 is made out of a first material that comprises first fiber reinforcement densified by a first matrix, while the second portion 23 of each blade 21 is made of a second material that comprises second fiber reinforcement densified by a second matrix.

The second material of the second portion 23 possesses abrasion resistance that is less than the abrasion resistance of the first material of the first portion 22. The abrasion resistance of the first material and of the second material is taken into consideration after the first matrix and the second matrix have solidified. The second portion 23 thus constitutes a zone of weakness forming the large clearance so as to allow the fan 2 to continue rotating even when off-axis relative to the axis Δ. When the fan 2 is off-axis relative to the axis Δ, the second portion 22 of each blade 21 rubs against the internal annular surface of the fan casing 4, thereby causing at least some of the second portion 23 to be removed, since the internal annular surface of the fan casing 4 possesses abrasion resistance that is greater than that of the second material.

Thus, and as shown in FIG. 3A, during normal operation of the fan 2, i.e. when the rotation of the fan 2 is about the axis Δ of the turbine engine 1, the second portion 23 of each blade 21 remains at a distance from the fan casing 4 and thus remains intact. Thus, compared with a prior art fan, the diameter of the fan 2 is increased without increasing the diameter of the fan casing 4. Thus, the bypass ratio (BPR) of the turbine engine 1 can be increased without increasing the weight of the turbine engine 1.

As shown in FIG. 3B, when the fan 2 losses a blade 21, the fan 2 becomes off-center relative to the axis Δ of the turbine engine 1, and the tip 21c of a blade 21 comes to rub against the fan casing 4, leading to wear and thus causing the second material of the second portion 23 to be removed.

Because the second material possesses abrasion resistance that is less than the abrasion resistance of the first material, it is ensured that the blade 21 wears down in the second portion 23 and that the blade 21 does not break in the first portion 22 when the tip 21c of the blade 21 comes into contact with the fan casing 4 as a result of the fan 2 moving off-axis relative to the axis Δ.

The difference in abrasion resistance between the first material and the second material may be obtained in various possible embodiments.

In a first possible embodiment, the second material of the second portion 23 is made weaker by using first and second matrices that possess different compositions, or in other words the first matrix and the second matrix are made of different materials, the second matrix possessing abrasion resistance that is less than the abrasion resistance of the first matrix.

In this first embodiment, the first fiber reinforcement of the first portion 22 and the second fiber reinforcement of the second portion 23 are formed using a single woven fiber preform, preferably woven by three-dimensional weaving. The first fiber reinforcement corresponds to the portion of the fiber preform situated in the root 21d of the blade 21 and in the portion of the fiber preform that is situated in the first portion 22, and the second fiber reinforcement corresponds to the portion of the fiber preform situated at the tip 21c of the blade 21, i.e. the portion of the fiber preform situated in the second portion 23.

In this first embodiment, the first matrix may typically be a resin as is conventionally used for making the matrices of fan blades, such as an epoxy resin, and, by way of example, the second matrix may be a semi-rigid polyurethane resin known as "smooth cast 65D". The woven fiber preform may be made of carbon fibers.

For the first embodiment, and as shown in FIG. 3B, when the fan 2 loses a blade 21, the fan 2 becomes off-center relative to the axis Δ of the turbine engine 1 and the tip 21c of the blade 21 rubs against the fan casing 4, thereby wearing away the second matrix of second material constituting the second portion 23. Once the second matrix of the second portion 23 of the blade 21 has been eliminated, at least in part, the second fiber reinforcement that was initially densified by the second matrix is laid bare and rubs against the fan casing 4, thereby limiting parasitic flows between the tips 21c of the blades 21 and the fan casing 4.

In a second embodiment, the difference in abrasion resistance between the first material and the second material is obtained by acting on the first fiber reinforcement and on the second fiber reinforcement.

In this second embodiment, the first fiber reinforcement is constituted by a woven fiber preform, preferably woven using three-dimensional weaving, that is embedded in the first matrix, while the second fiber reinforcement is formed by short fibers that are embedded in the second matrix.

The short fibers present length lying in the range 50 micrometers (μm) to 5000 μm, or in an embodiment length lying in the range 100 μm to 300 μm.

The fiber preform forming the first fiber reinforcement and the short fibers forming the second fiber reinforcement may be carbon fibers, for example.

The second embodiment offers the benefit of providing a difference in abrasion resistance between the first material and the second material that is greater than that of the first embodiment, since the reinforcing fibers perform a major role in providing abrasion resistance.

The first matrix and the second matrix may present the same composition, in other words the first matrix and the second matrix may be made of the same material, thereby simplifying fabrication of the blades 21. The first matrix and the second matrix in the second embodiment may be identical to the first matrix in the first embodiment.

The first matrix and the second matrix may nevertheless have compositions that are different, the second matrix possessing abrasion resistance that is less than that of the first matrix, so as to further reduce the abrasion resistance of the second portion 23. The first matrix of the second embodiment may be identical to the first matrix of the first embodiment, while the second matrix of the second embodiment may be identical to the second matrix of the first embodiment.

Figure 4:
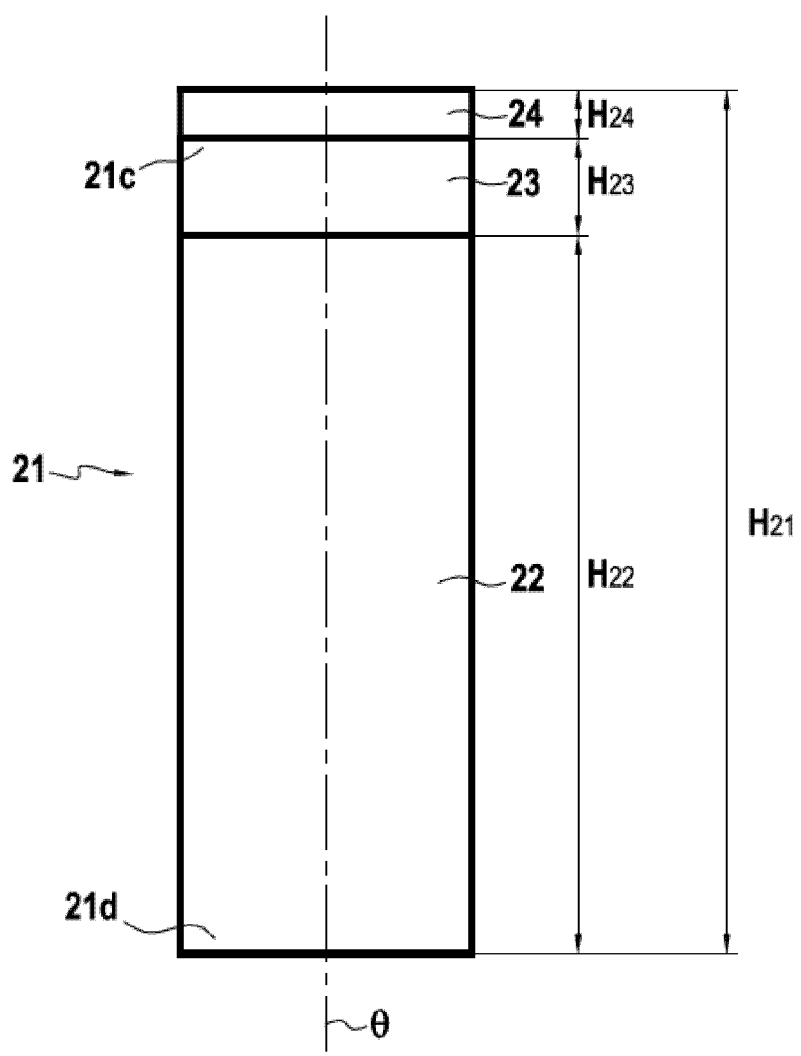
FIG. 4 shows a blade in a possible embodiment of the invention.

As shown in FIG. 4, the blade 21 has a main long axis θ that is perpendicular to the axis Δ of the turbine engine 1. The blade 21 has a total height $H_{21}$ that corresponds to the dimension of the blade 21 along its main long axis θ. The first portion 22 has a first height $H_{22}$, the second portion 23 has a second height $H_{23}$. The first height $H_{22}$ may lie in the range 90% to 99% of the total height $H_{21}$, and the second height $H_{23}$ may lie in the range 1% to 10%. In an embodiment the second height $H_{23}$ of the second portion 23 lies in the range 2% to 5% of the total height $H_{21}$ of the blade 21. Such ratios for the first height $H_{22}$ and the second height $H_{23}$ of the second portion 23 enable the fan 2 to be offset considerably so as to minimize the unbalance caused by losing a blade 21.

In a possible embodiment, the tip 21c of the blade 21 may be covered by a layer 24 of a third material that possesses abrasion resistance that is less than that of the second material. This layer 24 forms an abradable layer that is configured to be worn down by abrasion when contact is made with the fan casing 4. The layer 24 is eroded by the tip of the blade 21 making contact with the fan casing 4, thereby limiting as much as possible the amount of space between the tip of the blade 21 and the fan casing 4. In this embodiment, the second portion 23 is situated between the first portion 22 and the layer 24, and it is in contact with the second portion 22 and with the layer 24. Such an embodiment provides the benefit of limiting the quantity of abradable material (third material) that is used, thereby reducing the weight of the turbine engine 1. The layer 24 is eliminated together with the second portion 23 in the event of the fan 2 becoming off-centered as a result of losing a blade 21.

In another possible embodiment, the internal annular surface of the fan casing 4 is covered by a layer of the first material in order to form an abradable layer that is to be worn away by abrasion on contact with the second material of the matrix of the second portion 23 situated at the tip 21c of the blade 21. In the event of losing a blade 21 and of the fan 2 becoming off-centered, this abradable layer is eliminated by rubbing against the second portion 23 of the blade 21. Thereafter, once this abradable layer has been eliminated, the matrix of the second portion 23 is eliminated in turn when the second portion 23 comes into contact with the internal annular surface of the fan casing 4.

Figure 5:
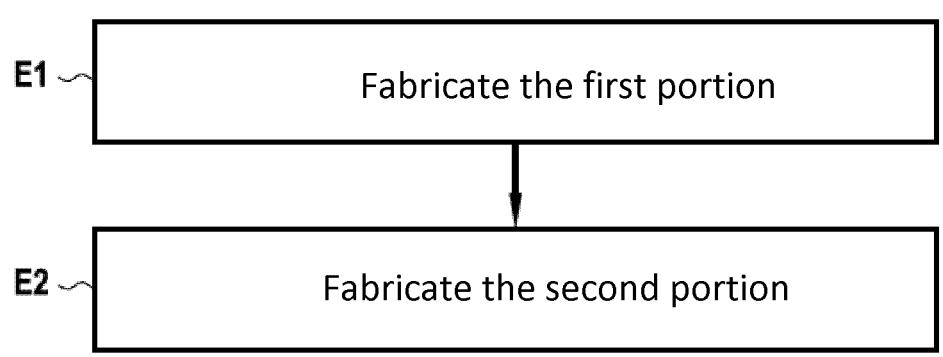
FIG. 5 is a diagram showing the steps of a method of fabricating a blade of an embodiment of the invention.

As shown in FIG. 5, in a possible implementation, the blade 21 of the invention is fabricated using a method of fabrication comprising the following steps:
  E1: fabricating the first portion 22 of the blade 21, the first portion extending to the root 21d of the blade 21 and being made of the first material, the first material comprising the first fiber reinforcement densified by the first matrix; and
  E2: fabricating the second portion 23 of the blade 21, the second portion extending to the tip 21c of the blade 21 and being made of the second material, the second material comprising the second fiber reinforcement densified by the second matrix, the second material possessing abrasion resistance that is less than that of the first material.

Several variants are possible for fabricating the first portion 22 and the second portion 23.

Figure 6A:
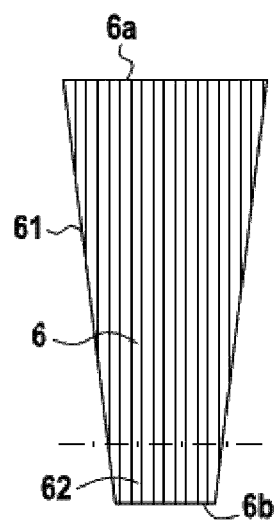
FIG. 6A shows a first step in a first variant of a method of fabricating a blade in a possible implementation of the invention.

In a first possible fabrication variant, as shown in FIG. 6A for fabricating the blade 21 of the first embodiment, the first portion 22 is fabricated by densifying a first zone 61 of a woven fiber preform 6, and the second portion 23 is fabricated by densifying a second zone 62 of the woven preform 6. The first zone 61 of the fiber preform 6 is situated at a first end 6a of the preform 6, and the second zone 62 of the fiber preform 6 is situated at a second end 6b of the preform 6, the second end 6b being opposite from the first end 6a. The first end 6a corresponds to the root 21d of the blade 21, and the second end 6b corresponds to the tip 21c of the blade 21.

The first zone 61 of the fiber preform 6 is densified by the first matrix, the first zone 61 of the fiber preform 6 forming the first reinforcement of the first material. The second zone 62 of the fiber preform is densified by the second matrix, the second zone 62 of the fiber preform forming the second fiber reinforcement of the second material. The compositions of the first matrix and of the second matrix are different, and the second matrix has abrasion resistance that is less than that of the first matrix.

Figure 6B:
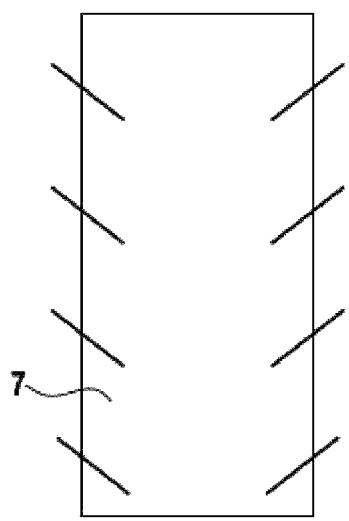
FIG. 6B shows a second step in a first variant of a method of fabricating a blade in a possible implementation of the invention.
Figure 6C:
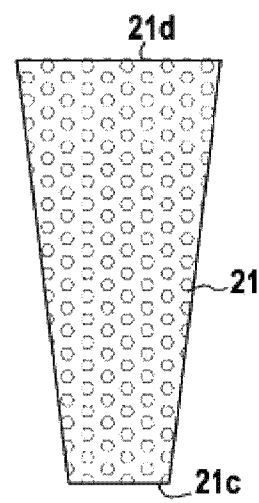
FIG. 6C shows a third step in a first variant of a method of fabricating a blade in a possible implementation of the invention.
Figure 6D:
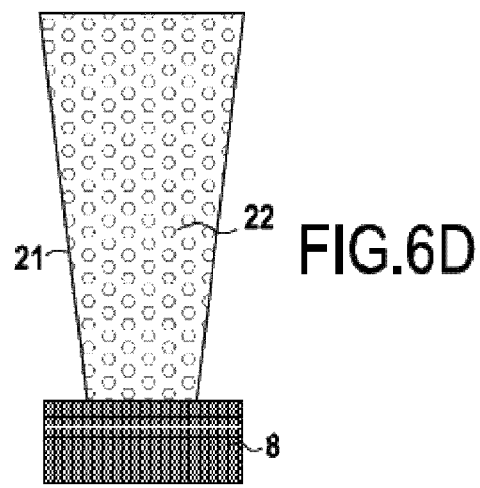
FIG. 6D shows a fourth step in a first variant of a method of fabricating a blade in a possible implementation of the invention.
Figure 6E:
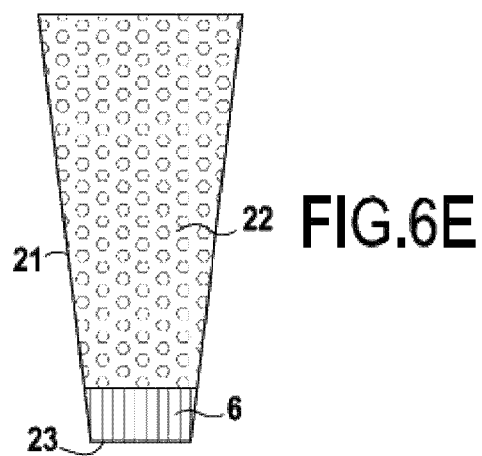
FIG. 6E shows a fifth step in a first variant of a method of fabricating a blade in a possible implementation of the invention.
Figure 6F:
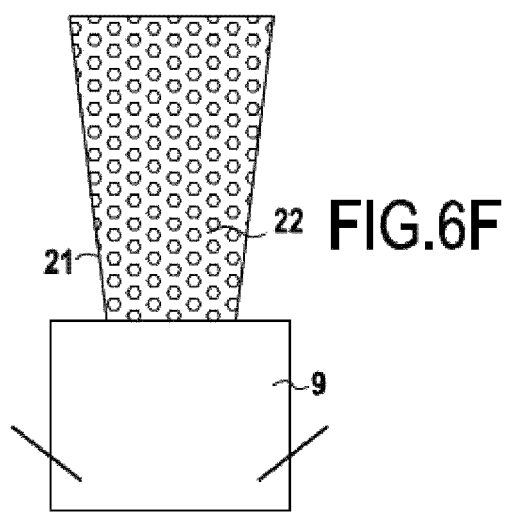
FIG. 6F shows a sixth step in a first variant of a method of fabricating a blade in a possible implementation of the invention.
Figure 6G:
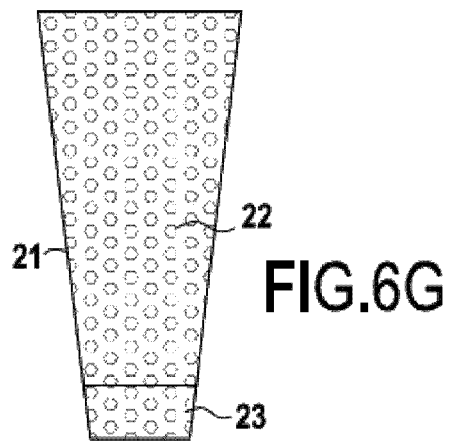
FIG. 6G shows a seventh step in a first variant of a method of fabricating a blade in a possible implementation of the invention.

In a first possible implementation of the first variant of the method of fabricating the blade 21, as shown in FIGS. 6A-6G, the method of fabrication may comprise the following steps:
  The fiber preform 6 is made, e.g. by 3D weaving fibers, as shown in FIG. 6A.
  Thereafter, the entire length of the fiber preform 6 is densified with the first matrix, as shown in FIG. 6B. To do this, the entire fiber preform is placed in a first mold 7 into which a material that is a precursor for the first matrix is injected and is polymerized.
  After the fiber preform 6 has been densified with the first matrix, a blade 21 is obtained having fiber reinforcement, preferably 3D woven reinforcement, that is completely densified with the first matrix, as shown in FIG. 6C.
  The first matrix is then eliminated from the second portion 23 of the blade 21. To do this, the second portion 23 of the blade 21 that extends from the tip 21c of the blade 21 is dipped in a tank 8 that contains a liquid in which the first matrix is dissolved, as shown in FIG. 6D. The first portion 22 of the blade 21 remains outside the tank 8.
  After eliminating the first matrix in the second portion 23 of the blade 21, the fiber preform 6 is bare over the second portion 23, as shown in FIG. 6E.
  Thereafter, the fiber preform 6 is densified over the second portion 23 of the blade 21 with the second matrix. To do this, and as shown in FIG. 6F, the second portion 23 of the blade 21 is placed in a second mold 9, and a material that is a precursor for the second matrix is injected into the fiber preform 6 and is then polymerized.
  As shown in FIG. 6G, after the second portion 23 of the blade 21 has been densified with the second matrix, the blade 21 comprises the first portion 22 with a first matrix and the second portion 23 with a second matrix that possesses abrasion resistance that is less than that of the first matrix.

In another possible variant, the fiber preform 6 is densified with the first matrix only in the first portion 22, and the method does not have a step of eliminating the first matrix over the second portion 23. For this purpose, only the first zone 61 of the fiber preform 6 is installed in the first mold 7 in order to be densified with the first material, the second zone 62 remaining outside the first mold 7.

In a second possible fabrication variant for fabricating the blade 21 of the second embodiment, and as shown in the FIGS. 7A-7E, the first portion 22 of the blade 21 is fabricated by densifying a fiber preform 6' over its entire length. The fiber preform 6' is densified with the first matrix. The densified fiber preform 6' forms only the first fiber reinforcement of the first material for the first portion 22 of the blade 21.

Figure 7A:
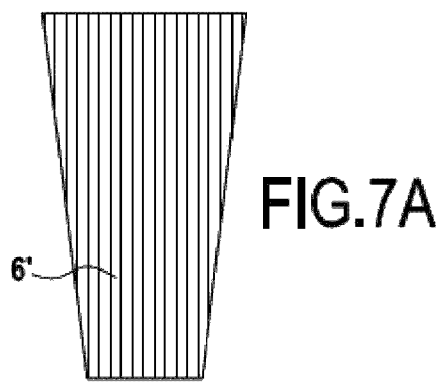
FIG. 7A shows a first step in a second variant of a method of fabricating a blade in a possible implementation of the invention.
Figure 7B:
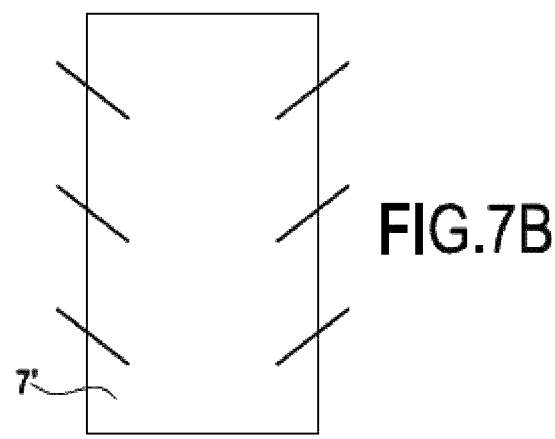
FIG. 7B shows a second step in a second variant of a method of fabricating a blade in a possible implementation of the invention.
Figure 7C:
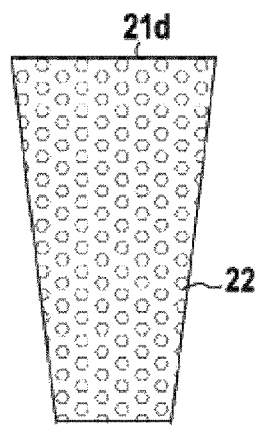
FIG. 7C shows a third step in a second variant of a method of fabricating a blade in a possible implementation of the invention.

The fiber preform 6' is made, e.g. by 3D weaving of fibers, as shown in FIG. 7A. Thereafter, the fiber preform 6' is densified over its entire length with the first matrix, as shown in FIG. 7B. To do this, the entire fiber preform 6' is placed in a first mold 7' into which a material that is a precursor for the first matrix is injected and is polymerized. The resulting part is shown in FIG. 7C and corresponds to the first portion 22 of the blade 21, the first portion 22 forming the bottom portion of the blade 21 that extends to the root 21d of the blade 21.

Figure 7D:
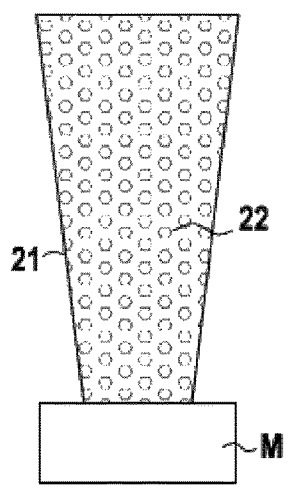
FIG. 7D shows a fourth step in a second variant of a method of fabricating a blade in a possible implementation of the invention.
Figure 7E:
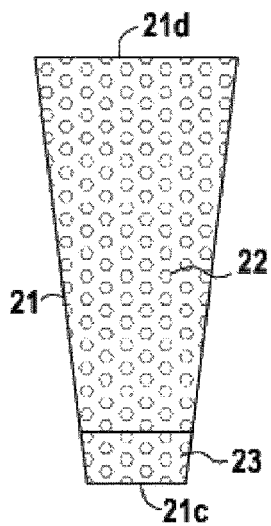
FIG. 7E shows a fifth step in a second variant of a method of fabricating a blade in a possible implementation of the invention.

Thereafter, the second portion 23 of the blade 21 is fabricated by molding the second matrix having short fibers dispersed therein to form the second fiber reinforcement, the second matrix being molded onto one end of the fiber preform 6'. This step is shown in FIG. 7D, with the molding of the second portion 23 being performed by a mold M. As shown in FIG. 7E, after the step of molding the second matrix having short fibers dispersed therein to form the second fiber reinforcement, the resulting blade 21 possesses both the first portion 22 at the root 21d of the blade 21 that is made of the first material, and also the second portion at the tip 21c of the blade 21 that is made of the second material.

Furthermore, in a possible variant, the layer 24 of the third material may be deposited on the tip 21c of the blade 21, above the second portion 23.

The invention claimed is:

1. A fan for a turbine engine configured to be driven in rotation about an axis by a fan shaft, the fan comprising a fan casing and a composite material fan blade of the turbine engine, the fan blade comprising:
    a first portion that extends to a root of the fan blade and that is made of a first material comprising first fiber reinforcement densified by a first matrix,
    a second portion that extends to a tip of the fan blade and that is made of a second material that is different from the first material and that comprises second fiber reinforcement densified by a second matrix, the second material possessing abrasion resistance that is less than that of the first material,
    wherein the first matrix and the second matrix are organic matrices,
    wherein the second portion is configured to remain at a distance from the fan casing and thus remain intact during normal operation of the fan when rotation of the fan is about the axis,
    wherein the fan casing includes an internal annular surface that possesses abrasion resistance that is greater than that of the second material, and
    wherein the second material possessing abrasion resistance that is less than that of the first material is such that, when the fan rotates in an off-axis position relative to said axis, a portion of the second material that rubs against the internal annular surface of the fan casing is abraded and the blade wears down in the second portion.

2. The fan according to claim 1, wherein the first fiber reinforcement and the second fiber reinforcement are made by a single fiber preform.

3. The fan according to claim 1, wherein the first fiber reinforcement is made by a fiber preform, and the second fiber reinforcement is made by short fibers.

4. The fan according to claim 1, wherein the fan blade extends along a main longitudinal axis and has a height that corresponds to a dimension of the fan blade along said main longitudinal axis from a first distal end to a second distal end of the fan blade, the second distal end being opposite the first distal end, and wherein the second portion has a height lying along said main longitudinal axis in the range 1% to 10% of the height of the fan blade.

5. The fan according to claim 4, wherein the second portion has a height lying in the range 2% to 5% of the height of the blade.

6. The fan according to claim 1, wherein the first matrix and the second matrix possess different compositions, and the second matrix possesses abrasion resistance that is less than that of the first matrix.

7. The fan according to claim 1, wherein the second portion is configured such that rubbing against the annular surface of the fan casing allows the fan to continue rotating even when off-axis relative to the axis.

8. The fan according to claim 1, wherein the first matrix is an epoxy resin and the second matrix is a semi-rigid polyurethane resin.

9. A turbine engine comprising the fan according to claim 1.

10. The turbine engine according to claim 9, wherein shaft is secured to the turbine engine by a main bearing, and the shaft also being secured to the turbine engine by a decoupler bearing that has a breaking limit that is lower than that of the main bearing.

11. A method of fabricating a composite material fan blade of a turbine engine, the fan blade comprising
    a first portion that extends to a root of the fan blade and that is made of a first material comprising first fiber reinforcement densified by a first matrix,
    a second portion that extends to a tip of the fan blade and that is made of a second material that is different from the first material and that comprises second fiber reinforcement densified by a second matrix, the second material possessing abrasion resistance that is less than that of the first material,
    wherein the first matrix and the second matrix are organic matrices,
    the method comprising:
        fabricating the first portion of the fan blade that extends to the root of the fan blade and that is made of the first material that comprises the first fiber reinforcement densified by the first matrix; and
        fabricating the second portion of the fan blade that extends to the tip of the fan blade and that is made of the second material that comprises the second fiber reinforcement densified by the second matrix, the second material possessing abrasion resistance that is less than that of the first material,
    wherein the first portion is fabricated by densifying the first matrix in a first zone of a fiber preform forming the first fiber reinforcement, the first zone extending to a first end of the fiber preform that corresponds to the root of the fan blade, and wherein the second portion is fabricated by using the second matrix to densify a second zone of the fiber preform forming the second fiber reinforcement, the second zone extending to a second end of the fiber preform that corresponds to the tip of the fan blade,
    and wherein the fiber preform is densified by the first matrix over its entire length, and then the first matrix is eliminated over the second zone of the fiber preform, and then said second zone of said fiber preform is densified with the second matrix after eliminating the first matrix.

12. A composite material fan blade of a turbine engine, the fan blade comprising: a first portion that extends to a root of the fan blade and that is made of a first material comprising first fiber reinforcement densified by a first matrix, a second portion that extends to a tip of the fan blade and that is made of a second material that is different from the first material and that comprises second fiber reinforcement densified by a second matrix, the second material possessing abrasion resistance that is less than that of the first material, wherein the first matrix and the second matrix are organic matrices, wherein the tip of the blade is covered by a layer of a third material that possesses abrasion resistance that is less than that of the second material, wherein the fan blade is part of a fan for the turbine engine configured to be driven in rotation about an axis by a fan shaft, the fan comprising a fan casing including an internal annular surface that possesses abrasion resistance that is greater than that of the second material, and wherein the second material possessing abrasion resistance that is less than that of the first material is such that, when the fan rotates in an off-axis position relative to said axis, a portion of the second material that rubs against the internal annular surface of the fan casing is abraded and the blade wears down in the second portion.

* * * * *